US008932492B2

(12) United States Patent
Lee et al.

(10) Patent No.: US 8,932,492 B2
(45) Date of Patent: Jan. 13, 2015

(54) ENERGY-SAVING ANTI-CORROSIVE METAL FILM COMPOSITION AND MANUFACTURING METHOD FOR THE SAME

(75) Inventors: Hyung Oh Lee, Gyeonggi-do (KR); Hyun Min Kim, Gyeonggi-do (KR); Jeung Euy Song, Gyeonggi-do (KR); Soo Ryang Park, Gyeonggi-do (KR)

(73) Assignee: L'Beste Gat Ltd., Seoul (KR)

( * ) Notice: Subject to any disclaimer, the term of this patent is extended or adjusted under 35 U.S.C. 154(b) by 357 days.

(21) Appl. No.: 13/577,655

(22) PCT Filed: Jan. 27, 2011

(86) PCT No.: PCT/KR2011/000563
§ 371 (c)(1),
(2), (4) Date: Aug. 7, 2012

(87) PCT Pub. No.: WO2011/099710
PCT Pub. Date: Aug. 18, 2011

(65) Prior Publication Data
US 2012/0298923 A1 Nov. 29, 2012

(30) Foreign Application Priority Data
Feb. 9, 2010 (KR) ........................ 10-2010-0012109

(51) Int. Cl.
C09K 3/00 (2006.01)
C23F 11/00 (2006.01)
C09D 183/02 (2006.01)
C09D 5/08 (2006.01)
C09D 5/10 (2006.01)
C09D 7/12 (2006.01)
C09D 183/14 (2006.01)
C23C 18/12 (2006.01)
C08G 77/58 (2006.01)

(52) U.S. Cl.
CPC .............. *C09D 183/02* (2013.01); *C09D 5/084* (2013.01); *C09D 5/103* (2013.01); *C09D 7/1283* (2013.01); *C08G 77/58* (2013.01); *C09D 183/14* (2013.01); *C23C 2222/20* (2013.01); *C23C 18/1216* (2013.01); *C23C 18/1254* (2013.01)
USPC ............ 252/389.31; 252/389.32; 252/389.52; 252/389.61

(58) Field of Classification Search
CPC .................................. C09D 5/084; C09D 5/08
USPC .............. 252/389.31, 389.32, 389.52, 389.61
See application file for complete search history.

(56) References Cited

U.S. PATENT DOCUMENTS 4,086,153 A * 4/1978 Ariga et al. .................... 204/507
5,558,701 A * 9/1996 Patel ............................. 427/2.27
5,939,197 A * 8/1999 Blohowiak et al. ........... 428/413
6,579,472 B2 * 6/2003 Chung et al. ............. 252/389.31
7,141,306 B1 * 11/2006 McKee et al. ................. 428/447
8,592,042 B2 * 11/2013 Blohowiak et al. ........... 428/447
2003/0024432 A1 * 2/2003 Chung et al. ............. 106/14.12
2006/0167147 A1 * 7/2006 Asgari ......................... 524/174
2008/0111027 A1 * 5/2008 Blohowiak et al. ........... 244/133
2008/0153930 A1 * 6/2008 Jang et al. ..................... 516/100
2008/0314284 A1 * 12/2008 Li et al. ........................ 106/31.9
2009/0022898 A1 * 1/2009 Standke et al. ............... 427/384
2009/0148711 A1 * 6/2009 Le Blanc et al. ............. 428/447
2009/0202815 A1 * 8/2009 Campazzi et al. ............ 428/328
2009/0212893 A1 * 8/2009 Hamada et al. ............... 335/302
2010/0119850 A1 * 5/2010 Browne et al. ................ 428/447
2010/0177384 A1 * 7/2010 Peroz et al. ................... 359/487
2010/0183887 A1 * 7/2010 Krienke ........................ 428/447
2010/0221443 A1 * 9/2010 Kimura et al. ............. 427/419.8
2010/0239824 A1 * 9/2010 Weitz et al. ................... 428/172
2010/0330380 A1 * 12/2010 Colreavy et al. ............. 428/447
2011/0003142 A1 * 1/2011 Asuka et al. .................. 428/329
2011/0046293 A1 * 2/2011 Fukuda ......................... 524/544
2011/0048282 A1 * 3/2011 Quijada Abarca et al. ............ 106/287.13
2011/0091654 A1 * 4/2011 Singh et al. ................... 427/387
2011/0206831 A1 * 8/2011 Asuka et al. ................... 427/58
2011/0244244 A1 * 10/2011 Nakatsukasa et al. ........ 428/413
2011/0318249 A1 * 12/2011 Nakayama et al. ........... 423/325
2012/0103231 A1 * 5/2012 Ishihara et al. ........... 106/287.11
2012/0298923 A1 * 11/2012 Lee et al. ................. 252/389.32
2012/0305849 A1 * 12/2012 Lee et al. ................. 252/389.32
2013/0029134 A1 * 1/2013 Wang et al. ................... 428/334
2013/0095317 A1 * 4/2013 Kramer et al. ................ 428/336
2014/0142218 A1 * 5/2014 Blohowiak et al. ........... 523/435
2014/0154441 A1 * 6/2014 Pranov ......................... 428/34.6

FOREIGN PATENT DOCUMENTS

| EP | 1785265 A1 | 5/2007 |
|---|---|---|
| JP | 05-230179 A | 9/1993 |
| JP | 2005-008982 A | 1/2005 |
| KR | 10-0385158 B1 | 5/2003 |
| KR | 10-0848671 B1 | 7/2008 |
| WO | WO 2004-098795 A1 | 11/2004 |

OTHER PUBLICATIONS

Lamaka et al. (Electrochimica Acta 53 (2008) 4773-4783).*
Wang et al. (Progress in Organic Coatings 64 (2009) 327-338).*
International Search Report with English translation, mailing date Nov. 23, 2011, for corresponding International Application No. PCT/KR2011/000563.

* cited by examiner

*Primary Examiner* — Liam J Heincer
(74) *Attorney, Agent, or Firm* — Intellectual Property Law Group LLP

(57) ABSTRACT

The present invention relates to an energy-saving anti-corrosive metal film composition and manufacturing method for the same. The energy-saving anti-corrosive metal film composition includes: at least one metal powder selected from the group consisting of aluminum, magnesium, and alloys thereof, having particle size of 5-10 um; a first sol-gel resin selected from the group consisting of zirconium tetra-n-butanolate, zirconium butoxide, isopropyl titanate, and mixtures thereof; a second sol-gel resin selected from the group consisting of tris[3-(trimethoxysilyl)propyl] isocyanurate, gamma-meta-acryloxypropyl trimethoxysilane and n-phenyl-gamma-aminopropyltrimetoxysilane, and mixtures thereof; and a solvent.

9 Claims, No Drawings

ENERGY-SAVING ANTI-CORROSIVE METAL FILM COMPOSITION AND MANUFACTURING METHOD FOR THE SAME

TECHNICAL FIELD

The present invention relates to an anti-corrosive coating agent, and, more particularly, to an energy-saving anti-corrosive metal film composition for use in an anti-corrosive coating agent which forms a composite layer of a metal film and an anti-corrosive film, and to a method of manufacturing the same.

BACKGROUND ART

Anti-corrosive coating agents are applied on a target to form a coating film so that the target is protected from pollution or corrosion, and are particularly widely utilized in order to protect the outer surface of metal parts which are assembled or coupled with a variety of products manufactured in many industrial fields.

An anti-corrosive coating agent is typically composed of metal powder mainly responsible for imparting the anti-corrosive function, an organic solvent, and a variety of additives which impart heat resistance, weather resistance, add thermal stability, anti-corrosion, etc.

Although such an anti-corrosive coating agent typically forms a single coating layer, Korean Patent No. 10-0848671 discloses a method of forming two composite coating layers including forming a metal film and forming an anti-corrosive film thereon, and a composition for use therein.

Specifically, a metal plating layer is formed on a target, after which a composition for anti-corrosive paint is applied on the metal plating layer to form an anti-corrosive film which is then cured at a high temperature of 280~350° C., thus forming a composite plating layer.

This method is a two-coating and one-baking procedure, and so exhibits better anti-corrosion compared to other methods of forming an anti-corrosive coating layer, but is problematic because the curing temperature is very high to the range of 280~350° C. and thus the emission of carbon is high and the consumption of energy is large, and the metal plating layer penetrates into the anti-corrosive film undesirably resulting in a high defective rate and deteriorated acid resistance and corrosion resistance.

DISCLOSURE

Technical Problem

Accordingly, the present invention has been made keeping in mind the above problems occurring in the related art, and an object of the present invention is to provide an anti-corrosive metal film composition, which enables low-temperature curing thus increasing energy-saving effects and preventing particles of a metal film from penetrating into an anti-corrosive film.

Technical Solution

An aspect of the present invention provides a metal film composition, including metal powder comprising at least one selected from the group consisting of aluminum, magnesium and alloys thereof, having a particle size of 5~10 μm; a first sol-gel resin selected from the group consisting of zirconium tetra-n-butanolate, zirconium butoxide, isopropyl titanate, and mixtures thereof; a second sol-gel resin selected from the group consisting of tri-(3-(trimethoxysilyl)propyl) isocyanurate, gamma-methacryloxypropyltrimethoxysilane, n-phenyl-gamma-aminopropyltrimethoxysilane, and mixtures thereof; and a solvent.

As such, the metal film composition preferably comprises 100~160 parts by weight of the metal powder, 35~60 parts by weight of the first sol-gel resin, 165~250 parts by weight of the second sol-gel resin, and 60~90 parts by weight of the solvent.

Furthermore, the metal powder preferably comprises 70~100 parts by weight of an aluminum-magnesium alloy and 30~60 parts by weight of aluminum.

Also, the first sol-gel resin preferably comprises 20~30 parts by weight of zirconium tetra-n-butanolate, 10~20 parts by weight of zirconium butoxide, and 5~10 parts by weight of isopropyl titanate.

Also, the second sol-gel resin preferably comprises 30~50 parts by weight of tri-(3-(trimethoxysilyl)propyl) isocyanurate, 50~70 parts by weight of gamma-methacryloxypropyltrimethoxysilane and 50~70 parts by weight of n-phenyl-gamma-aminopropyltrimethoxysilane.

Also, the solvent is preferably acetone.

Another aspect of the present invention provides a method of manufacturing an energy-saving anti-corrosive metal film composition, including 1) mixing metal powder selected from the group consisting of aluminum, magnesium and alloys thereof, having a particle size of 5~10 μm, with a solvent for 2~3 hours so that the metal powder is dispersed in the solvent to create a first mixture; 2) mixing the first mixture with a first sol-gel resin selected from the group consisting of zirconium tetra-n-butanolate, zirconium butoxide, isopropyl titanate, and mixtures thereof and performing stirring at 300~400 rpm for 3~5 hours to create a second mixture; and 3) mixing the second mixture with a second sol-gel resin selected from the group consisting of tri-(3-(trimethoxysilyl) propyl) isocyanurate, gamma-methacryloxypropyltrimethoxysilane, n-phenyl-gamma-aminopropyltrimethoxysilane, and mixtures thereof and performing stirring at 100~200 rpm for 4~7 hours.

As such, in 2) the temperature is preferably maintained at 15~20° C.

Furthermore, in 3) the temperature is preferably maintained at 10~15° C.

Advantageous Effects

According to an embodiment of the present invention, an anti-corrosive metal film composition does not penetrate into an anti-corrosive coating layer formed thereon, thus exhibiting superior properties including corrosion resistance, chemical resistance, durability, mechanical strength and so on.

Also, an anti-corrosive metal film composition according to an embodiment of the present invention can be cured at low temperature, thus saving the consumption of energy and reducing environmental pollution.

Best Mode

An embodiment of the present invention provides an anti-corrosive metal film composition including metal powder, a sol-gel resin and a solvent.

The metal powder is the main material which imparts the anti-corrosive function to an anti-corrosive coating agent, and includes light metals, such as aluminum, magnesium, aluminum-magnesium alloys, etc. The particle size of the metal powder is preferably 5~10 μm. If the particle size thereof is less than 5 μm, the specific surface area becomes large undesirably increasing viscosity. In contrast, if the particle size thereof is more than 10 μm, the metal film may penetrate into the anti-corrosive film which will be formed thereon, undesirably deteriorating acid resistance.

The metal powder is typically sphere-shaped. When respective powder particles are not completely spherical, the particle size is defined as an average value between the longest line and the shortest line, which pass through the inside of the particles.

Although the powder particles have slightly different sizes, the size of particles which are distributed in the greatest number or the average particle size will be taken as the particle size of the powder.

The amount of the metal powder is preferably set to 100~160 parts by weight. If the amount of the metal powder is less than 100 parts by weight, heat resistance may decrease. In contrast, if the amount thereof is more than 160 parts by weight, the force of adhesion may decrease.

The sol-gel resin is a gel-form resin resulting from a sol-gel reaction. The sol-gel resin may include at least one selected from the group consisting of zirconium tetra-n-butanolate, zirconium butoxide, isopropyl titanate, tri-(3-(trimethoxysilyl)propyl)isocyanurate, gamma-methacryloxypropyltrimethoxysilane, n-phenyl-gamma-aminopropyltrimethoxysilane, and mixtures thereof.

The sol-gel resin has high bondability to the metal powder and dense tissue, so that the component material of the metal film does not penetrate into the anti-corrosive film and superior corrosion resistance, acid resistance, heat resistance and scratch resistance may be obtained.

The amount of the sol-gel resin is preferably set to 165~250 parts by weight. More preferably, the sol-gel resin includes a first sol-gel resin and a second sol-gel resin. Particularly, the amount of the first sol-gel resin is 35~60 parts by weight using 20~30 parts by weight of zirconium tetra-n-butanolate, 10~20 parts by weight of zirconium butoxide, and 5~10 parts by weight of isopropyl titanate, and the amount of the second sol-gel resin is 130~190 parts by weight using 30~50 parts by weight of tri-(3-(trimethoxysilyl)propyl)isocyanurate, 50~70 parts by weight of gamma-methacryloxypropyltrimethoxysilane and 50~70 parts by weight of n-phenyl-gamma-aminopropyltrimethoxysilane.

If the amounts of zirconium tetra-n-butanolate, zirconium butoxide and isopropyl titanate of the first sol-gel resin fall out of the above ranges, small particles may be formed upon coating, undesirably causing clogging of the nozzle upon spray coating. The above amounts are regarded as important.

Also if the amounts of tri-(3-(trimethoxysilyl)propyl) isocyanurate, gamma-methacryloxypropyltrimethoxysilane and n-phenyl-gamma-aminopropyltrimethoxysilane of the second sol-gel resin fall out of the above ranges, uniform dispersion of the metal powder fails and thus very severe precipitation results, making it difficult to use the composition.

Because the sol-gel resin is very sensitive, when the stability thereof is decreased due to the preparation sequence, temperature or the like, gelling may instantly occur. The first and second sol-gel resins are experimentally separated depending on the degree of gelling. Upon preparation, the first sol-gel resin and the second sol-gel resin are sequentially mixed and stirred.

Unlimited examples of the solvent may include acetone, dipropyleneglycol, butyl diglycol, isopropyl alcohol, etc. Particularly useful is acetone.

Also, the anti-corrosive metal film composition according to the present invention may further include an additive such as a defoamer, a dispersant, and a surface modifier, or an organic solvent which controls the curing rate, and does not limit the addition of other additives. For example the defoamer may include a silicone-modified polyoxypropylene-based defoamer, and the dispersant may include a polyoxyethyleneether-based dispersant, and the surface modifier may include a glycidoxypropyltrimethoxysilane-based surface modifier.

The anti-corrosive metal film composition according to the present invention is used to form a composite coating layer including an additional anti-corrosive film thereon. As such, the anti-corrosive film is preferably formed by applying an anti-corrosive film composition including a silane-modified epoxy resin, but the present invention is not limited thereto. The unlimited example of the anti-corrosive film composition including the silane-modified epoxy resin is disclosed in Korean Patent No. 10-0848671 mentioned in the Background Art.

In addition, a method of manufacturing the anti-corrosive metal film composition according to another embodiment of the present invention includes dispersing metal powder, mixing and stirring a first sol-gel resin, and mixing and stirring a second sol-gel resin.

Dispersing the metal powder is performed by mixing metal powder having a size of 5~10 μm in a solvent at room temperature for 2~3 hours to create a first mixture.

Next, mixing and stirring the first sol-gel resin is performed by mixing the above first mixture with a first sol-gel resin and conducting stirring at 300~400 rpm for 3~5 hours to create a second mixture. As such, the temperature is preferably maintained at 15~20° C.

Next, mixing and stirring the second sol-gel resin is performed by mixing the second mixture with a second sol-gel resin and conducting stirring at 100~200 rpm for 4~7 hours. As such, the temperature is preferably maintained at 10~15° C.

If the manufacturing conditions such as the mixing time, stirring rate, and temperature fall out of the above ranges, the stability of the sol-gel resin may deteriorate, remarkably shortening the length of the anti-corrosive period. For example, when parts such as bolts, nuts, etc., are subjected to anti-corrosive coating by being dipped, they should be used for at least six weeks but may actually be used for only one week.

EXAMPLE

Example 1

90 parts by weight of an aluminum-magnesium alloy having a size of 8 μm and 35 parts by weight of aluminum having a size of 8 μm were mixed with 70 parts by weight of acetone at room temperature for 2 hours. Subsequently, the temperature was adjusted to 15° C., after which 29 parts by weight of zirconium tetra-n-butanolate, 15 parts by weight of zirconium butoxide and 5 parts by weight of isopropyl titanate were added thereto and the resulting mixture was stirred at 400 rpm for 5 hours. Subsequently, the temperature was adjusted to 10° C. and the stirring rate was decreased to 100 rpm, after which 35 parts by weight of tri-(3-(trimethoxysilyl)propyl) isocyanurate, 60 parts by weight of gamma-methacryloxypropyltrimethoxysilane and 55 parts by weight of n-phenyl-gamma-aminopropyltrimethoxysilane were added thereto and stirring was performed for 5 hours, yielding an anti-corrosive metal film composition.

As such, the zirconium tetra-n-butanolate had a molecular weight of 384 (28% zirconium oxide content, 16% n-butanol content), the zirconium butoxide had a molecular weight of 383 and the isopropyl titanate had a molecular weight of 284.

Furthermore, the molecular weight of tri-(3-(trimethoxysilyl)propyl)isocyanurate was 136.3, the molecular weight of gamma-methacryloxypropyltrimethoxysilane was 248.4, and the molecular weight of n-phenyl-gamma-aminopropyltrimethoxysilane was 255.4

Example 2

An anti-corrosive metal film composition was manufactured under the same mixing conditions as in Example 1, with the exception that only the amount of zirconium tetra-n-butanolate was changed to 20 parts by weight.

Example 3

An anti-corrosive metal film composition was manufactured under the same mixing conditions as in Example 1, with the exception that only the amount of zirconium butoxide was changed to 10 parts by weight.

Example 4

An anti-corrosive metal film composition was manufactured as in Example 1, with the exception that 125 parts by weight of aluminum having a size of 8 μm was used alone as the metal powder instead of the mixture of aluminum-magnesium alloy and aluminum.

Example 5

An anti-corrosive metal film composition was manufactured under the same mixing and stirring conditions as in Example 1, with the exception that a first sol-gel resin and a second sol-gel resin were sequentially added.

Comparative Example 1

An anti-corrosive metal film composition was manufactured under the same conditions as in Example 1, with the exception that an aluminum-magnesium alloy having a size of 15 μm was used.

Comparative Example 2

An anti-corrosive metal film composition was manufactured under the same conditions as in Example 1, with the exception that an aluminum-magnesium alloy having a size of 20 μm was used.

Comparative Example 3

An anti-corrosive metal film composition was manufactured as in Example 1, with the exception that an epoxy resin was used instead of the sol-gel resin.

Test Example

The anti-corrosive metal film composition of each of the examples and comparative examples was applied on the surface of steel using a spraying process, and before this composition was dried, a silane-modified epoxy resin disclosed in Korean Patent No. 10-0848671 (published on 2008 Jul. 28) was applied thereon using a spraying process, thus forming composite anti-corrosive films having a thickness of 20~25 μm, after which their acid resistance, adhesion, waterproof adhesion, corrosion resistance and creeping-up of a metal layer were measured. The results are shown in Table 1 below. All of the anti-corrosive films were cured at 130° C. for about 10 min. The specific methods are summarized in Table 1 below.

TABLE 1

Properties of Composite Anti-corrosive Coating Layer

| Item Evaluated | Evaluation Method | Example 1 | 2 | 3 | 4 | 5 | Comparative Example 1 | 2 | 3 |
|---|---|---|---|---|---|---|---|---|---|
| Acid Resistance | After immersion in 10% Hydrofluoric acid solution for 30 minutes, there was no swelling, splitting, peeling | ◎ | ◎ | ◎ | ○ | ○ | Δ | X | Δ |
| Creeping-up of Metal Layer | Observation with Naked Eye | ◎ | ○ | ◎ | ○ | Δ | X | Δ | X |
| Waterproof Adhesion | After immersion in water at 40 ± 2° C. for 120 hours, there was no swelling, splitting, discoloration, and low attachment | ◎ | ◎ | ○ | ○ | ○ | Δ | X | X |
| Corrosion Resistance | 5% NaCl solution Saline spraying test (hours) | 1000 | 900 | 800 | 800 | 800 | 400 | 300 | 300 |

(◎: excellent, ○: good, Δ: fair, X: poor)

As is apparent from Table 1, the composite coating compositions of Examples 1 to 3 exhibited superior acid resistance, waterproof adhesion, corrosion, etc., but the anti-corrosive films coated with the compositions of Comparative Examples 1 and 2 were very poor in all properties. This is considered to be due to the size of the aluminum-magnesium alloy used as the metal powder, the properties of the sol-gel resin, and the ratio of components of the composition.

Although the embodiments of the present invention have been disclosed for illustrative purposes, those skilled in the art will appreciate that a variety of different variations and modifications are possible, without departing from the scope and spirit of the invention as disclosed in the accompanying claims.

Accordingly, the scope of the invention is determined by the claims and is not limited to the contents described herein, and the variations and modifications should also be understood as falling within the scope of the present invention.

What is claimed is:

1. An energy-saving anti-corrosive metal film composition, including:
    metal powder comprising at least one selected from the group consisting of aluminum, magnesium and alloys thereof, having a particle size of 5~10 μm;
    a first sol-gel resin selected from the group consisting of zirconium tetra-n-butanolate, zirconium butoxide, isopropyl titanate, and mixtures thereof;
    a second sol-gel resin selected from the group consisting of tri-(3-(trimethoxysilyl)propyl)isocyanurate, gamma-methacryloxypropyltrimethoxysilane, n-phenyl-gamma-aminopropyltrimethoxysilane, and mixtures thereof; and
    a solvent.

2. The energy-saving anti-corrosive metal film composition of claim 1, comprising 100~160 parts by weight of the metal powder, 35~60 parts by weight of the first sol-gel resin, 165~250 parts by weight of the second sol-gel resin, and 60~90 parts by weight of the solvent.

3. The energy-saving anti-corrosive metal film composition of claim 2, wherein the metal powder comprises 70~100 parts by weight of an aluminum-magnesium alloy and 30~60 parts by weight of aluminum.

4. The energy-saving anti-corrosive metal film composition of claim 3, wherein the first sol-gel resin comprises 20~30 parts by weight of zirconium tetra-n-butanolate, 10~20 parts by weight of zirconium butoxide, and 5~10 parts by weight of isopropyl titanate.

5. The energy-saving anti-corrosive metal film composition of claim 4, wherein the second sol-gel resin comprises 30~50 parts by weight of tri-(3-(trimethoxysilyl)propyl)isocyanurate, 50~70 parts by weight of gamma-methacryloxypropyltrimethoxysilane and 50~70 parts by weight of n-phenyl-gamma-aminopropyltrimethoxysilane.

6. The energy-saving anti-corrosive metal film composition of claim 5, wherein the solvent is acetone.

7. A method of manufacturing an energy-saving anti-corrosive metal film composition, including:
    1) mixing metal powder selected from the group consisting of aluminum, magnesium and alloys thereof, having a particle size of 5~10 μm, with a solvent for 2~3 hours so that the metal powder is dispersed in the solvent to create a first mixture;
    2) mixing the first mixture with a first sol-gel resin selected from the group consisting of zirconium tetra-n-butanolate, zirconium butoxide, isopropyl titanate, and mixtures thereof and performing stirring at 300~400 rpm for 3~5 hours to create a second mixture; and
    3) mixing the second mixture with a second sol-gel resin selected from the group consisting of tri-(3-(trimethoxysilyl)propyl)isocyanurate, gamma-methacryloxypropyltrimethoxysilane, n-phenyl-gamma-aminopropyltrimethoxysilane, and mixtures thereof and performing stirring at 100~200 rpm for 4~7 hours.

8. The method of claim 7, wherein in 2) a temperature is maintained at 15~20° C.

9. The method of claim 8, wherein in 3) a temperature is maintained at 10~15° C.

* * * * *